Figure 4:
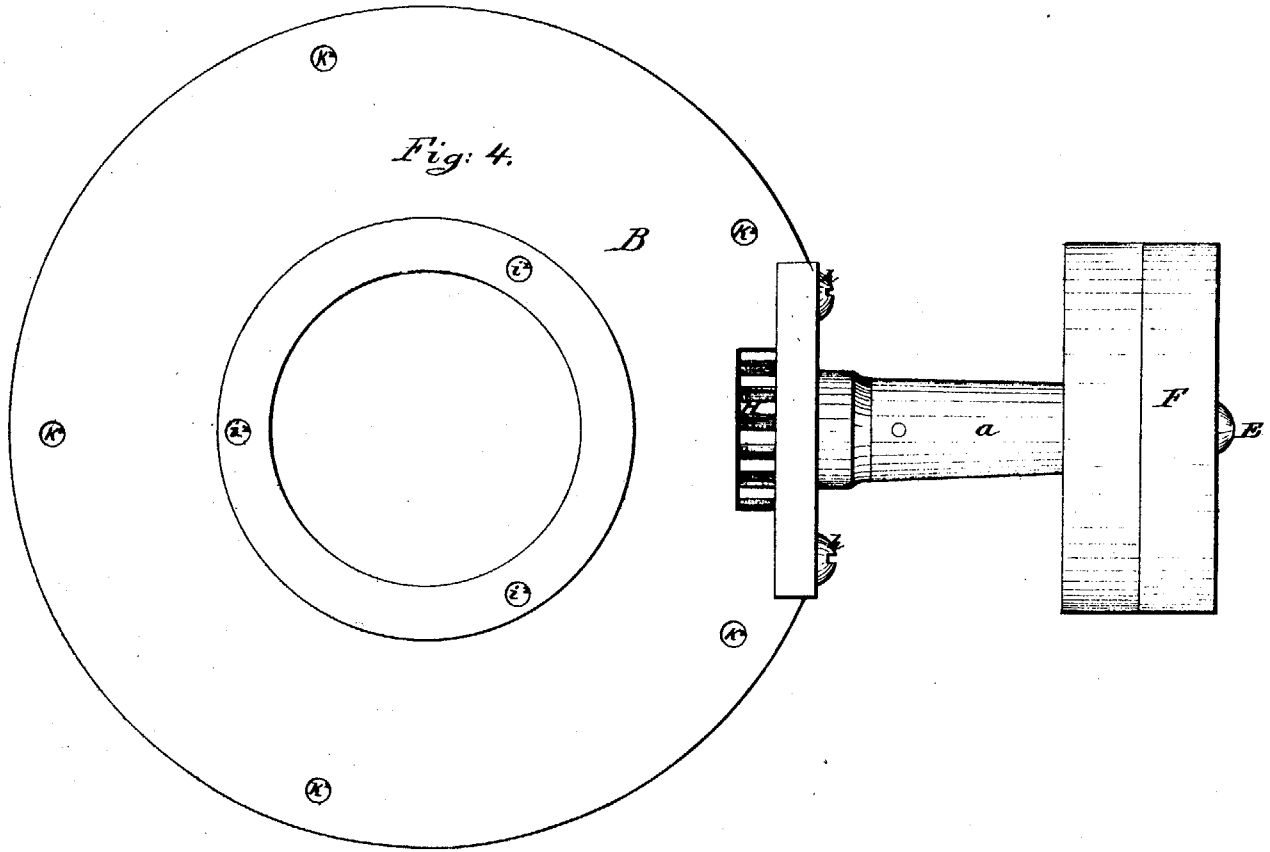

4 Sheets. Sheet 1.
Wm. J. B. Aiken,
Knitting Mach.
No. 926. Reissued Mar. 13. 1860.
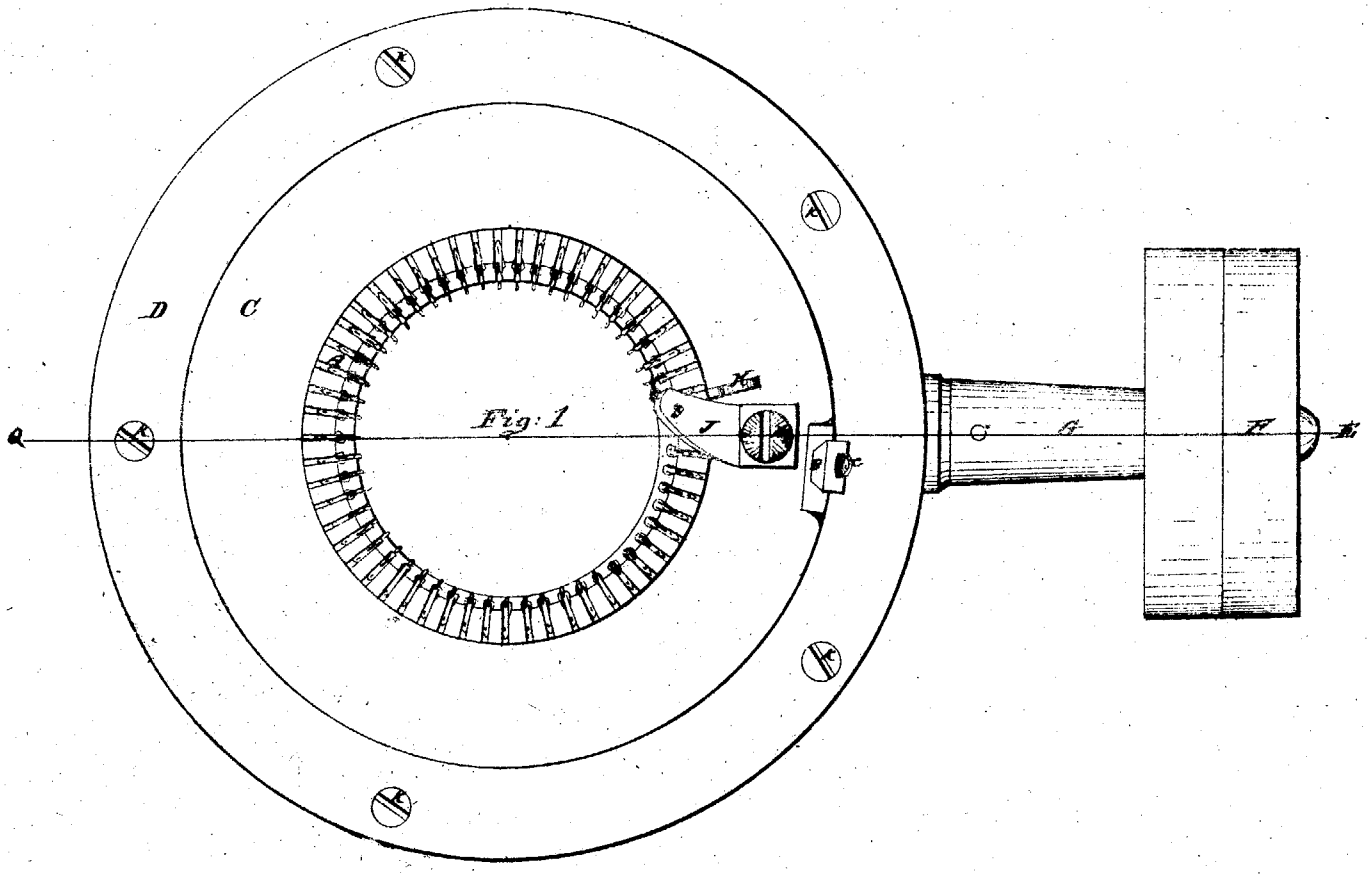

W. & J. B. Aiken,
4 Sheets, Sheet 2
Knitting Mach.
No. 926.
Reissued Mar. 13. 1864
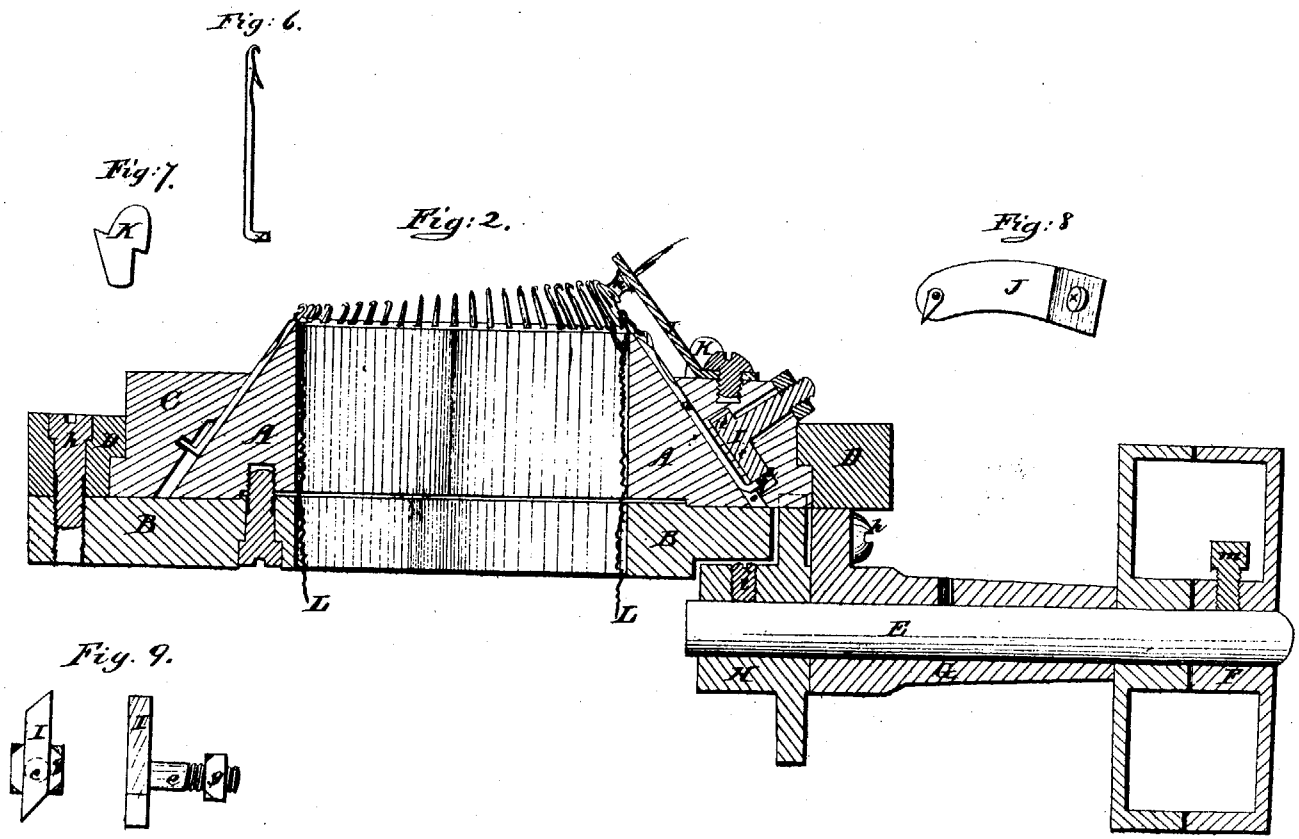
N. PETERS, PHOTO-LITHOGRAPHER, WASHINGTON, D. C.

Examine
M. & J. B. Aiken,
4 Sheets, Sheet 3.
Knitting Mach.
No. 926. Reissued Mar. 13. 1860.
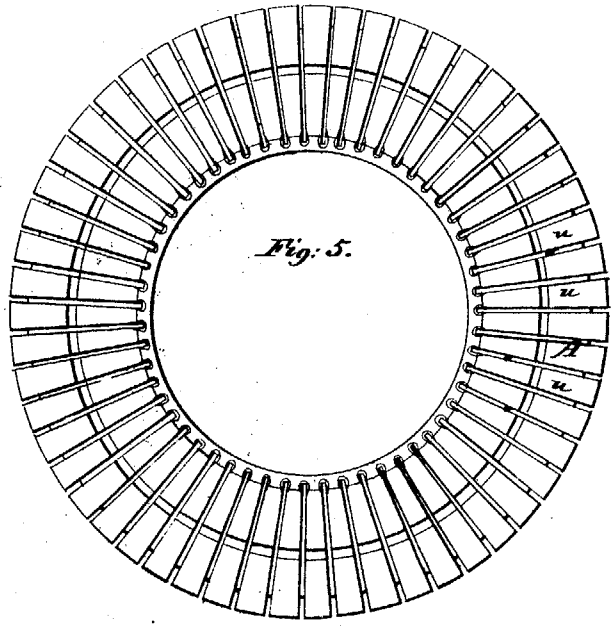
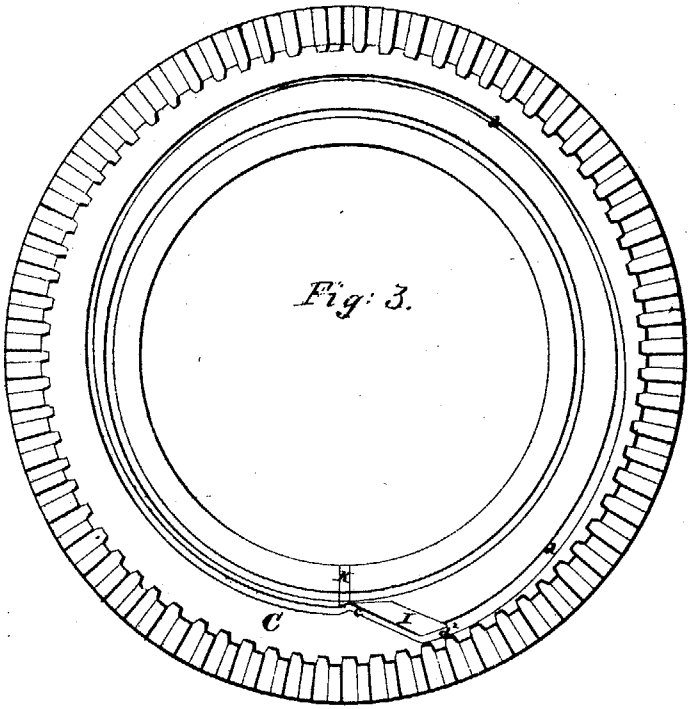
N. PETERS, PHOTO-LITHOGRAPHER, WASHINGTON, D. C.

Examine

34

4 Sheets, Sheet 4.

W. & J. B. Aiken,

Knitting Mach.

No. 926. Reissued Mar. 13. 1864.

H. PETERS, PHOTO-LITHOGRAPHER, WASHINGTON, D. C.

BEST AVAILABLE COPY

UNITED STATES PATENT OFFICE.

JONAS B. AIKEN, OF MANCHESTER, NEW HAMPSHIRE, ASSIGNEE, BY MESNE ASSIGNMENTS, OF WALTER AIKEN AND JONAS B. AIKEN.

IMPROVEMENT IN KNITTING-MACHINES.

Specification forming part of Letters Patent No. 13,561, dated September 11, 1855; Reissue No. 926, dated March 13, 1860.

*To all whom it may concern:*

Be it known that the following is a full, clear, and exact description of certain new and useful Improvements in Knitting Machines, invented by WALTER AIKEN and JONAS B. AIKEN, and for which Letters Patent of the United States were granted to HERRICK AIKEN, assignee of the said WALTER AIKEN, and to said JONAS B. AIKEN on the 11th day of September, 1855; and the said HERRICK AIKEN having sold, assigned, and set over to the said JONAS B. AIKEN all the right, title, and interest which the said HERRICK AIKEN had in the said Letters Patent by deed of assignment bearing date the 20th day of July, 1859, recorded in the United States Patent Office on the 28th day of July, 1859, in Liber $G^5$, page 330, of Transfers of Patents. The said JONAS B. AIKEN surrendered the said Letters Patent to the Commissioner of Patents for the purpose of describing the same invention and pointing out in what it consists in more clear, full, and exact terms than was done in said original specification, reference being had to the annexed drawings, making part of this specification.

Figure 1 is a plan of the machine; Fig. 2, a section upon the line Q Q of Fig. 1. Fig. 3 is a view of the driving-plate inverted, showing the groove which guides the arms or shanks of the needles and operates them. Fig. 4 is the bed plate upon which the operating parts are placed. Fig. 5 is a plan of the needle-plate, showing the grooves in which the needles slide. Fig. 6 represents the kind of needle used. Figs. 7, 8, and 9 are parts detached from the driving-plate, hereinafter to be described.

To enable others skilled in the art to make and use our invention, we will proceed to describe the method which we have adopted of carrying it out, describing first the general features of the machine, and then more particularly the nature and details of our improvements.

B is the bed-plate, (shown in Fig. 4,) and to which the operating parts of the machine are attached. Through the center of this bed-plate there is an opening, down through which passes the finished fabric, as seen at L, Fig. 2.

A is a hollow circular needle-plate, through which the fabric also passes. This plate is shown in Figs. 1 and 5, and is also seen in section, Fig. 2, but may be made of a disk form and answer an equally good purpose. It is secured to the bed-plate by screws which pass through the holes $i^2$ of the bed-plate, one of which is seen at $i$, section Fig. 2, or it may be fastened in any other convenient manner. On the exterior or upper surface of this plate, or of a disk-plate when used, grooves are cut for the reception of the needles. These grooves are longer than the needles, and of a sufficient size to hold them steadily and at the same time to allow them to slide freely back and forward. They are of such a depth that the needles are flush with the surface of the bars $u$ $u$ between the needle grooves. This plate is made conical (or of a disk form, when required) for the purpose of extending the distance between the shanks or arms of the needles $x$ farther apart than the barbed ends. By this device the movement of the needles is greatly facilitated while passing through the groove from $c$ to $d^2$, Fig. 3, and section Fig. 2.

By this method of construction and arrangement each needle performs in succession, first, the office of throwing off the old loop; second, drawing the yarn through the knit fabric into the mouth of the groove $o$, Figs. 1 and 2, the fabric being held back by the edge of the plate L and bars $u$ $u$, between the needle grooves $o$. By this construction and arrangement we dispense with both sinkers and sinker-wheel, now in common use, and also with levers or springs to accelerate the movement of the needles while drawing the loop. The angle of the exterior or upper surface of this plate is made at forty-five degrees or thereabouts; but it may be varied from this angle either way to a flat or disk surface or form, as zero or ninety degrees, as it is not material as to any precise angle for the successful operation of the needles in the plate, as a flat or disk plate will answer an equally good purpose as the conical plate.

Upon the needle-plate is placed the driving-plate C. The interior or under surface of this plate corresponds with and rests upon the exterior or upper surface of the needle-plate A, and thus the needles are retained in their proper positions in the grooves.

BEST AVAILABLE COPY

The plates A and C are seen in section, Fig. 2, with the needles *a a* between them.

The driving-plate C is constructed and operated in the following manner: *d* is a spiral groove, (seen in plan in Fig. 3, and in section in Fig. 2,) in which the arms or shanks of the needles *x* play.

When the arms are at the highest or interior portion of the groove, as at *c*, Figs 2 and 3, the hooks of the needles are open and ready to receive the yarn, the latches being thrown back by the loops as the needles move forward. At this point the loops on the needles pull back the latches previous to drawing a new loop. When the arms of the needles are at the lowest or outward portion, as at $d^2$, the needles are drawn down or back, the barbs or hooks of the needles being closed by the action of the loops passing over the latches. The groove passes abruptly from the point *c* to $d^2$, at an angle of about forty-five degrees, but the angle of either portion of the groove in which the arms of the needles play may be varied, and still the principles of action in forming the loops remain the same. While the needles are traversing this portion of the groove, (from *c* to $d^2$,) the loops are formed upon the fabric, as seen at *p* and $d^2$, section Fig. 2. At this point is placed a device for regulating the lengths of the loops, which we denominate the "loop-regulator." It is seen in place at I in Figs. 2 and 3, and detached in Fig. 9.

*e* is a screw-rod attached to the regulator I, which passes through a slot in plate C, section Fig. 2. It is confined in position by the nut *g'*. When it is desired to make a longer loop, the needles must recede farther in the groove *o* for that purpose. This is effected by depressing the regulator I and tightening the nut *s'*, and vice versa, when a shorter loop is required. The loop-regulator is sunk in a cavity in the plate at about the depth of the groove *d*, its outer or upper surface being flush with the inner or under surface of the plate. It is made of hardened steel, and of such a shape as to drive the needles abruptly down or along the groove *d*.

Through the driving-plate *c* all the other parts of the machinery are actuated. It is set in motion as follows: E is the driving-shaft to which is attached the driving-pulley F and the cog-wheel H, by means of the screws *m* and *v*. This shaft runs in the box G, which is secured to the bed-plate by the screws *h h*. The cog-wheel H engages with the cogs upon the lower edge of the driving-plate, which revolves as the driving-shaft is turned. The driving-plate is held in place by the ring D, which rests upon the projecting flange on the foot of plate C. It is secured to the bed-plate by screws which pass through the holes $k^2$, one of which is seen in section Fig. 2 at *k*. The ring D fits closely upon the flange of the plate C, but still so as to allow the latter to revolve freely.

When the several parts of the machine are adjusted in the manner described, it is then ready to insert the needles, which is done in the following manner: By taking out the gate K a channel will be opened in the plate C, through which the needles are passed into their respective grooves in the needle-plate A, or, if a needle should become broken or impaired, it can be taken out and another inserted in like manner. The arm J is then attached to the plate C by the screws *s*, Figs. 1 and 2. The yarn guide or carrier and latch-regulator are attached to this arm.

The yarn is represented in red, and passes through the tube or yarn-guide *n* to the needles, and thus as the driving plate is revolved each needle in succession forms a new loop upon the fabric knit.

What is claimed as the invention of the said WALTER AIKEN and JONAS B. AIKEN is as follows, to wit:

1. The use of a hollow circular needle-plate, substantially as hereinbefore described, and having grooves in the outer or upper surface, for the purpose hereinbefore set forth.

2. The loop regulator I, or equivalent thereof, for the purposes and objects substantially as hereinbefore described.

3. The loop-regulator, or equivalent thereof, in combination with the needle *a* and hollow circular needle-plate A, having grooves in the outer or upper surface, as hereinbefore described, the said several parts operating in the manner and for the purposes as before set forth.

JONAS B. AIKEN.

Witnesses:
R. ROWLEY,
ROBT. S. ROWLEY.